US006371187B1

(12) United States Patent
Nowaczyk

(10) Patent No.: US 6,371,187 B1
(45) Date of Patent: Apr. 16, 2002

(54) SYSTEM FOR CONTINUOUSLY MANUFACTURING SECURITY TAGS

(75) Inventor: David J. Nowaczyk, Carol Stream, IL (US)

(73) Assignee: Wallace Computer Services, Inc., Hillside, IL (US)

( * ) Notice: Subject to any disclaimer, the term of this patent is extended or adjusted under 35 U.S.C. 154(b) by 0 days.

(21) Appl. No.: 09/437,663

(22) Filed: Nov. 10, 1999

Related U.S. Application Data

(62) Division of application No. 08/861,522, filed on May 22, 1997, now Pat. No. 6,096,153.

(51) Int. Cl.[7] ................................................ B32B 31/00

(52) U.S. Cl. ....................... 156/511; 156/519; 156/552; 156/383; 156/199; 156/265; 156/267; 156/270; 156/272.4; 156/301; 156/303; 340/572; 53/453

(58) Field of Search ............................ 156/209, 272.4, 156/301, 303, 256, 253, 269, 267, 199, 210, 219, 292, 302, 308.4, 552, 265, 270, 519, 383; 53/453, 559; 340/572

(56) References Cited

U.S. PATENT DOCUMENTS

| | | | | |
|---|---|---|---|---|
| 3,000,157 | A | 9/1961 | Ollier et al. | 53/559 |
| 3,942,829 | A | 3/1976 | Humble et al. | 292/316 |
| 3,978,637 | A | 9/1976 | Mauriello | 53/450 |
| 5,469,140 | A | 11/1995 | Liu et al. | 340/551 |
| 5,493,275 | A | 2/1996 | Easter et al. | 340/572 |
| 5,495,230 | A | 2/1996 | Lian | 340/551 |
| 5,499,015 | A | 3/1996 | Winkler et al. | 340/551 |

*Primary Examiner*—Linda Gray
(74) *Attorney, Agent, or Firm*—Roylance, Abrams, Berdo & Goodman, L.L.P.

(57) ABSTRACT

A system for continuously manufacturing security tags involves supplying housing stock material in a continuous web from a supply station and then forming housing cavities in the housing stock material without separating the continuous web. Resonator strips are inserted in the housing cavities downstream of the plastic forming. The housing cavities with the inserted resonator strips are closed and sealed with lid stock material which is placed over the open ends of the housing cavities. Bias strips are attached to the outer surface of the lid stock material remote from the housing cavity. Cover strip material is then placed over the bias strips and outer surface of the lid stock material.

16 Claims, 4 Drawing Sheets

SYSTEM FOR CONTINUOUSLY MANUFACTURING SECURITY TAGS

REFERENCE TO RELATED APPLICATION

This application is related to U.S. patent application Ser. No. 08/848,726 filed concurrently herewith in the name of David J. Nowaczyk and entitled Precise Strip Material Cutter, the subject matter of which is hereby incorporated by reference, and is a division of application Ser. No. 08/861,522, filed May 22, 1997, now U.S. Pat. No. 6,096,153.

FIELD OF THE INVENTION

The present invention relates to an apparatus and method of continuously manufacturing security or electronic article surveillance tags. More particularly, the present invention relates to a method and apparatus which form housing cavities in a plastic web, insert resonator strips in the cavities, cover the cavities with lid stock, attach bias strips on the lid stock outer surface and place cover stock over the bias strips and lid stock.

BACKGROUND OF THE INVENTION

Electronic article surveillance devices such as security tags or labels are placed on products to prevent theft. These devices are often used in retail stores. An activated security tag is placed on an item to sound an alarm at the store exit if the security tag is not deactivated. No alarm will sound if the tag is properly deactivated at the store cash register after the customer has purchased the appropriate item.

The security tag basically comprises a resonator strip mounted loosely to permit movement in a plastic housing. A magnetic bias strip is attached outside this housing and is covered with a plastic layer. When the bias strip is magnetized, it will cause the security tag to be active. The security tag is deactivated by demagnetizing the bias strip.

With the bias strip of the security tag magnetized, the resonator can receive a signal from a transmitter to absorb energy from the transmitter. When the transmitter stops transmitting, the resonator strip vibrates because of its proximity to the magnetized bias strip to transmit its own signal at a set frequency. This signal from the vibrating resonator strip can be picked up by a receiver to set off the alarm. If the bias strip is demagnetized, the resonator strip will not transmit its own signal at the set frequency to set off the alarm.

Conventionally, the security tags are made by cutting plastic styrene sheets and placing the cut sheets in a forming mold. Heat is applied to the sheet while a vacuum pressure pulls the plastic into the mold to conform the sheet to the mold to form housing cavities. Resonator strips cut to length at another manufacturing location or production line are placed in the formed housing cavities. Clear plastic lid stock is cut to shape and placed over the formed styrene sheet to close the cavities with the resonator strips inside. The lid stock and styrene layers are then joined by heat sealing. The bias strips or magnets are then placed on the outer surfaces of the lid stock and secured by an adhesive layer.

In a separate production line, the sheet can be cut into individual labels with the waste material being removed. Additionally, an activation field can be provided to activate the tags. Automatic and manual testing can also be performed in downstream processing.

This conventional manufacturing system cannot be made fully automatic and does not permit use of a single production line to make a finally manufactured security tag. The required operator assistance, coordination of separate production lines and the movement of the respective parts between the separate production lines increases the cost of manufacture and slows production.

SUMMARY OF THE INVENTION

An object of the present invention is to provide a method and apparatus for continuously manufacturing security tags which can simply and inexpensively manufacture the security tag in a highly precise manner at high production rates.

Another object of the present invention is to provide a method and apparatus for continuously manufacturing security tags which can make the entire tag in a single production line.

The foregoing objects are basically obtained by an apparatus for continuously manufacturing security tags comprising a first supply for plastic housing material in a continuous web and a plastic former downstream of the first supply for forming housing cavities in the housing plastic material without separating the continuous web. A resonator feeder is downstream of the plastic former and places resonator strips in the housing cavities. A second supply is downstream of the resonator feeder and places lid stock material over open ends of the housing cavities to seal the housing cavities closed with the resonator strips therein. A bias feeder is downstream of the resonator feeder for attaching bias strips to the outer surface of the lid stock material remote from the housing cavities. A third supply is adjacent the bias feeder and places cover stock material over the bias strips and outer surface of the lid stock material.

The foregoing objects are also basically obtained by a method of continuously manufacturing security tags comprising the steps of supplying housing stock material in a continuous web from a first supply station, forming housing cavities in the housing stock material without separation of the continuous web in a plastic forming station located downstream of the first supply station, inserting resonator strips in the housing cavities in a resonator feed station located downstream of the plastic forming station, closing and sealing the housing cavities with the resonator strips therein by placing the lid stock material over open ends of the housing cavities in a second supply station located downstream of the resonator feed station, attaching bias strips to an outer surface of the lid stock material remote from the housing cavities in a bias feed station downstream from the resonator feed station, and placing cover strip material over the bias strips and the outer surface of the lid stock material in a third supply station adjacent the bias feed station.

By forming the apparatus and by performing the method of the present invention in this manner, the security tags can be manufactured simply, precisely, rapidly and inexpensively. Particularly, the apparatus and method permit the entire security tag to be made in a single production line with each of the base materials being provided in large continuous rolls.

Other objects, advantages and salient features of the present invention will become apparent from the following detail description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE INVENTION

Figure 1:
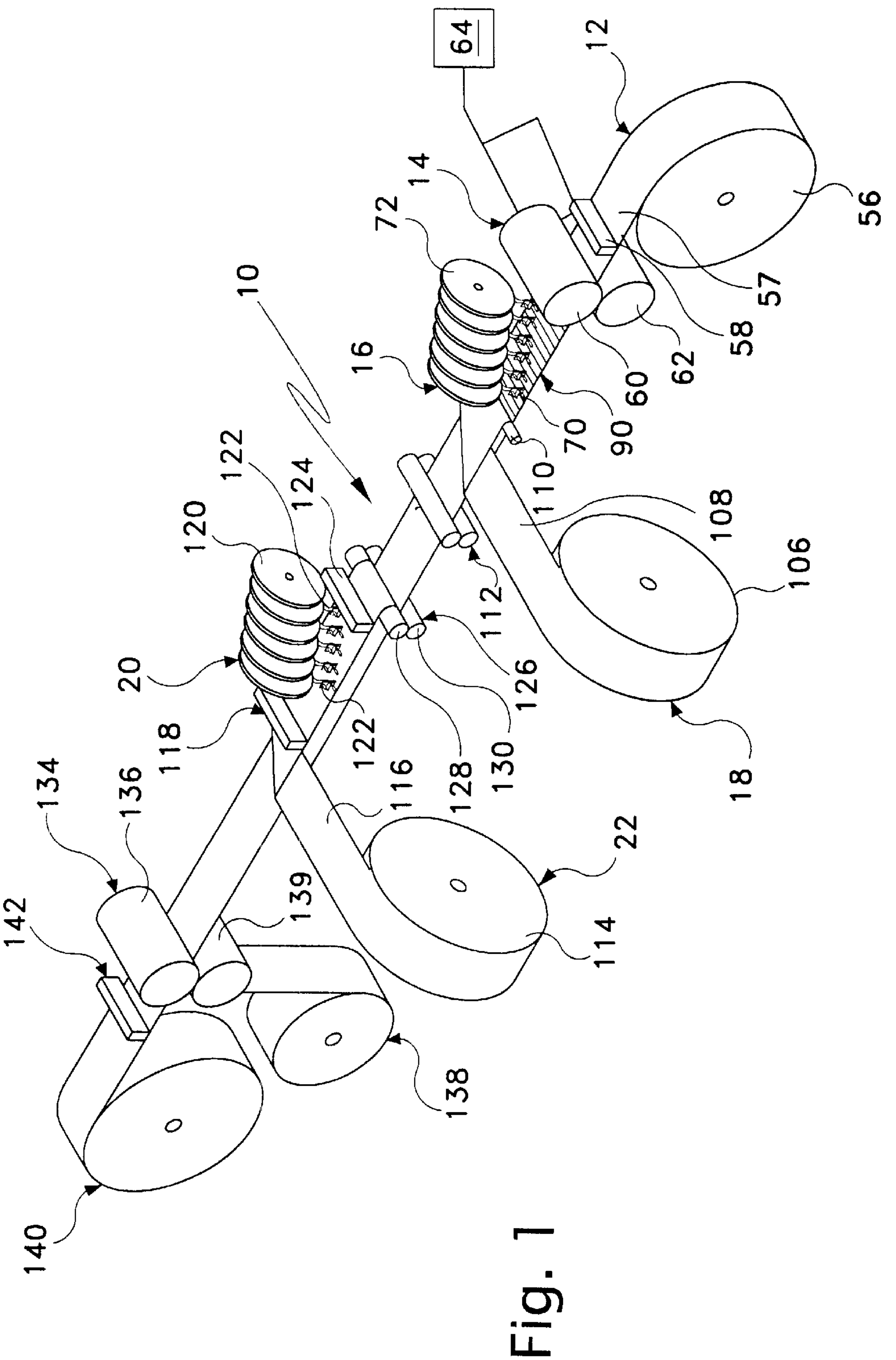
FIG. 1 is a diagrammatic, side elevational view graphically illustrating the system for manufacturing security tags according to the present invention.
Figure 2:
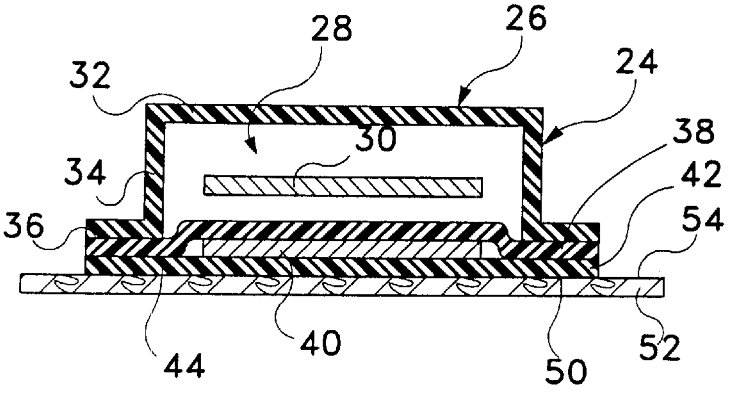
FIG. 2 is a side elevational view in cross-section of a security tag manufactured according to the system of FIG. 1.
Figure 3:
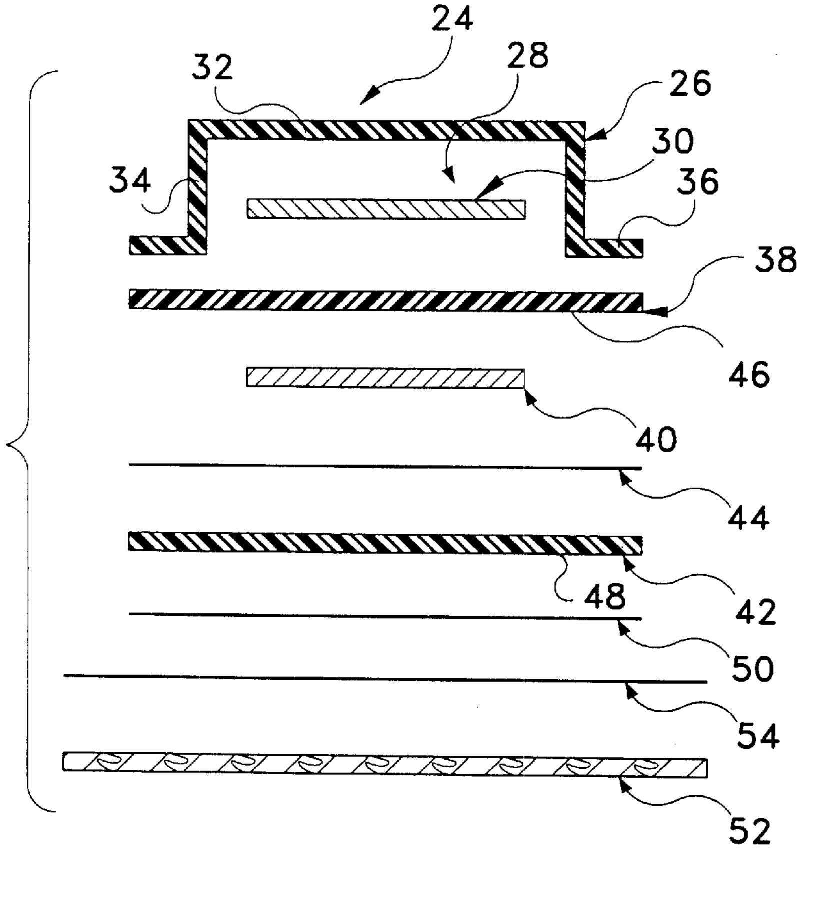
FIG. 3 is an exploded, side elevational view of the security tag of FIG. 2.

Referring initially to FIG. 1, the apparatus 10 for continuously manufacturing security tags according to the present invention comprises a housing supply station 12, a plastic forming station 14, a resonator feed station 16, a lid stock supply station 18, a bias feed station 20, and a cover stock supply station 22. These six stations supply and/or form the parts for forming the security tag 24 illustrated in FIGS. 2 and 3.

Security tag 24 comprises a hollow housing 26 having a housing cavity 28 receiving a metal resonator strip 30. Housing 28 is formed of plastic, such as 0.010 inch thick, high impact polyethylene with 0.0015 inch thick low density polyethylene. Housing top 32 has depending sides 34 and a peripheral base 36 extending laterally outwardly from the ends of sides 34 remote from top 32. Housing cavity 28, as defined between sides 34 and top 32, has greater dimensions than the corresponding dimensions of the rectangular resonator strip 30 such that the resonator strip is free to vibrate within the cavity without restriction by housing 26. A lid 38 is secured to housing base 36 to close cavity 28 with resonator strip 30 in the cavity. The lid is formed of plastic stock of polyester and polyethylene, typically of 0.0045 inch thick. Lid 38 can be secured to housing base portion 38 by heat sealing or by an adhesive.

Magnetic or magnetizable bias strip 40 is attached to cover 42 by adhesive layer 44. In forming the security tag, the adhesive layer is applied to cover 42. The bias strip is attached to cover 42 by adhesive layer 44, and the bias strip cover composite is then attached to outer surface 46 of lid 38 by the portion of adhesive layer 44 not covered by bias strip 40. Outer surface 48 of cover 42 is provided with a pressure sensitive adhesive layer 50. Adhesive layer 50 facilitates attachment of the security strip to other structures.

Figure 5:
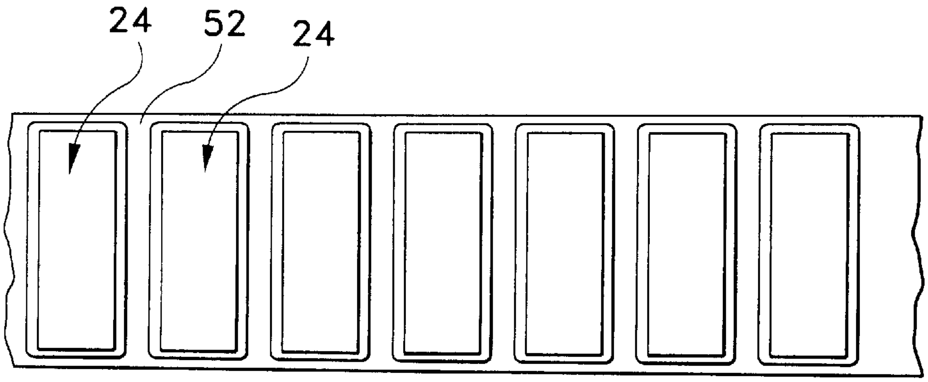
FIG. 5 is a top plan view of one form of the finished product manufactured according to the system of FIG. 1.

A paper liner 52 with a silicon release coating 54 covers adhesive layer 50, with the release coating in direct contact with adhesive layer 50. The paper liner with the release coding facilitates storage and transport of the security tags, while permitting the security tag to be readily removed from the paper liner, as illustrated in FIG. 5, with pressure-sensitive adhesive active for adhering the security tags to the desired structures or articles.

Housing supply station 12 contains a roll of the plastic material stock 57 for forming housing 26. The roll of housing stock material is typically 12 inches in width to permit the formation of six parallel rows of the housings to be formed simultaneously. Typically, the roll can have 7,000 linear feet of the housing stock material. The thickness and width of the material for forming the housings depends on the nature of the material and the size of each security tag desired. The width is chosen to maximize production, while minimizing waste. The housing stock material is unwound from roll 56 and is fed into the manufacturing method or production line in a continuous web.

The housing stock material from roll 56 is conveyed as a continuous web into plastic forming station either with or without being pre-heated by pre-heater 58. The operation of the pre-heater 58 depends on the nature of the material being formed and other characteristics of the forming station.

Figure 4:
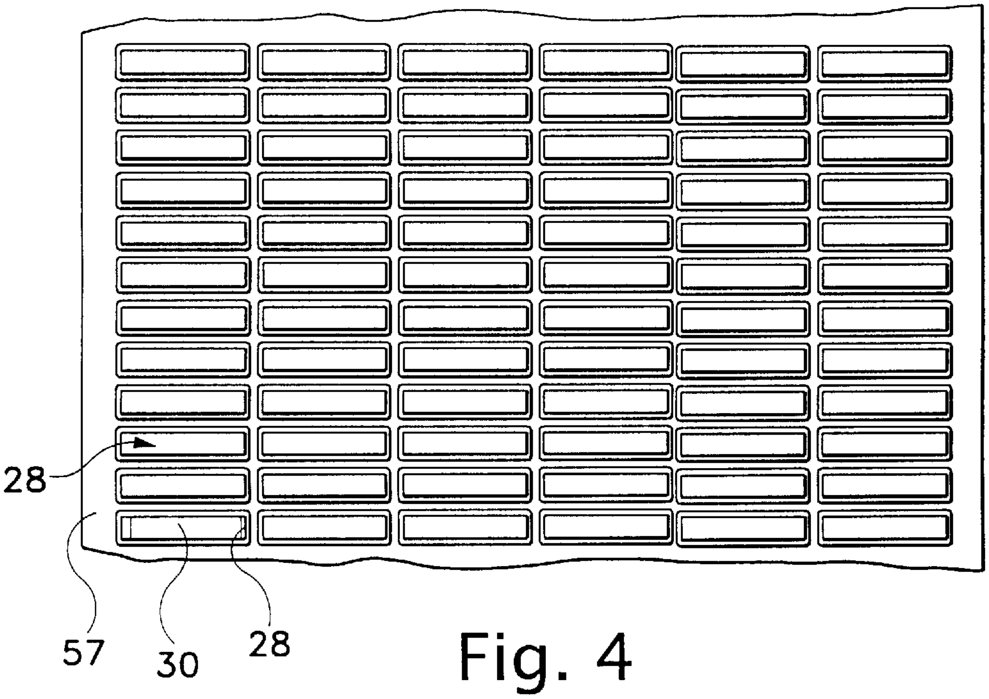
FIG. 4 is a top plan view of a section of the formed housing stock material upon exiting the plastic forming station of the system of FIG. 1.

Plastic forming station 14 comprises engraved cylinders 60 and 62 defining a nip between them. Cylinder 60 has positive or convex images on its outer surface, while cylinder 62 has negative or concave images on its outer surface appropriate to form the housing cavities in the housing stock. The forming of the housing stock can be assisted by coupling cylinders 60 and 62 to a vacuum pressure source 64 to ensure that the housing stock material conforms to the cavity forming images on the two cylinders. Additionally, the cylinders can be heated. As the housing stock material exits forming station 14, the formed material has a plurality of the housings with the housing cavities, but is maintained in the form of a continuous web, as illustrated in FIG. 4, as it passes into resonator feed station 16.

Resonator feed station 16 includes six resonator strip cutters arranged side-by-side along the direction of travel of housing stock material 57. Each cutter precisely forms resonator strips from a roll of specialized magnetostrictive material of predetermined width and thickness. The resonator strip is cut to an exact length. The precise length of the resonator strip is critical to the functioning of the security tag, specifically to the frequency of the signal to be generated by the resonator strips.

Figure 6:
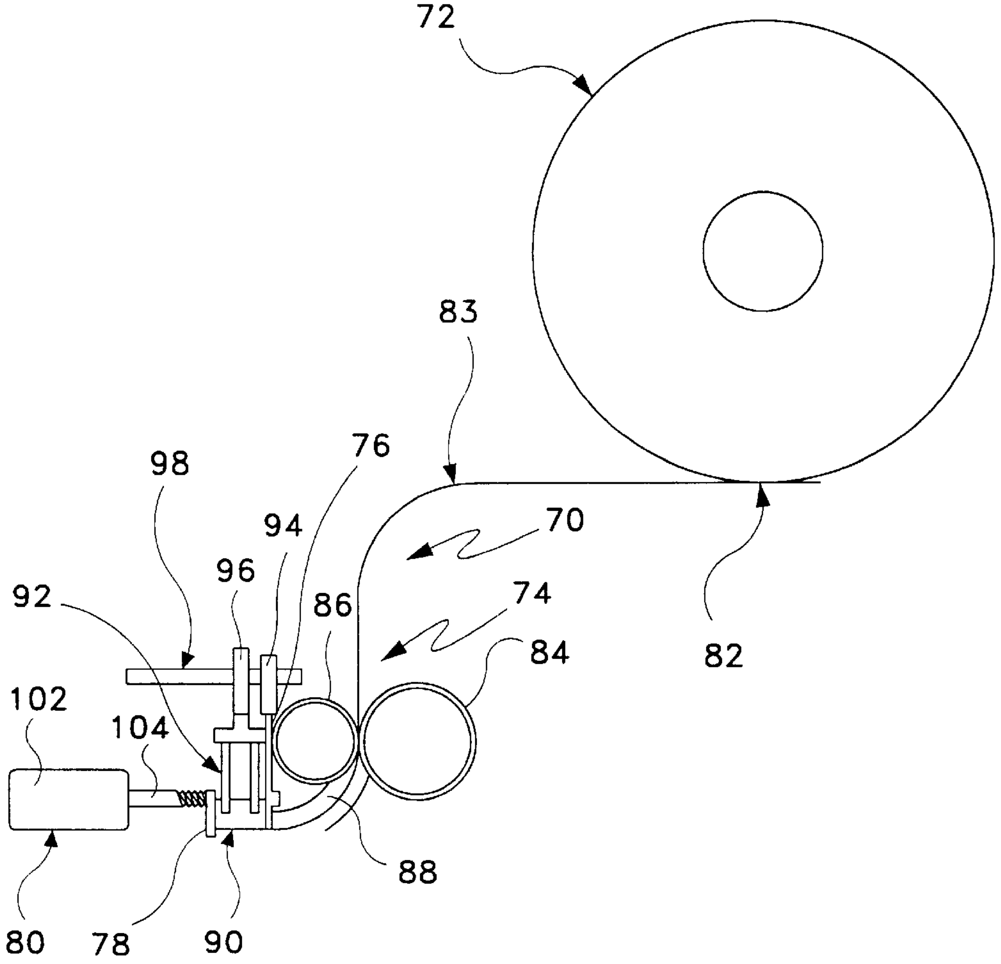
FIG. 6 is a diagrammatic, side elevational view graphically illustrating a cutting apparatus for forming the resonator strips and the bias strips according to the present invention.

The basic features of each strip cutting apparatus 70 of the present invention are graphically illustrated in FIG. 6. The cutting apparatus is disclosed in greater detail in the concurrently filed patent application incorporated by reference on page 1 of this application.

The cutting apparatus comprises a supply 72 of strip material 83 which is conveyed by a feed means 74 to a reciprocating cutter 76. An adjustable stop 78 is movably mounted adjacent cutter 76 for engaging a free end of the strip material and setting a precise length of the strip material to be cut. Adjustment means 80 is coupled to stop 78 for moving the stop relative to cutter 76 along a longitudinal axis of the length of strip material being cut.

Supply 72 is in the form of a spirally wound wheel or roll of the strip material. The dispensing of the strip material 83 from supply 72 is controlled by a drag brake 82 mounted adjacent supply 72.

Feed means 74 controls the tension of the strip material, and includes feed drive wheels 84 and 86 for conveying the strip material at a rate of approximately 160 feed per minute. From the feed drive wheels, the strip material 73 is fed through a feed chute 88 to a low magnetic strip holder or slide bed 90. The strip holder is magnetized for maintaining the strip material in position for the cutting by cutter 76. The strip material is fed until its free end engages stop 78.

After the length of strip material is cut, it is removed or forced from the strip holder by ejector pins 92. The ejector pins reciprocate in a vertical direction parallel to the vertical reciprocation of cutter 76.

Cutter 76 and ejector pins 92 are mounted for reciprocal sliding motion. The movement of cutter 76 is controlled by a rotating cam 94. The reciprocal movement of ejector pins 92 is controlled by rotating cam 96. The cams are rotated by a suitable drive 98.

As graphically illustrated in FIG. 6, the adjustment means basically comprises an electric stepper motor 102 which is coupled to an externally threaded rod 104 for rotating the rod and which can selectively move in annular increments of a partial rotation. Very fine threads on rod 104 are engaged with mating very fine threads on stop 78 such that rotation of rod 104 will cause precise movement of stop 78 in increments of 0.0001 inch, toward and away from cutter 76 along the longitudinal axis of the strip material being cut, i.e., transverse to the reciprocating motion of cutter 76. In this manner, electrical impulses to motor 102 can be used to operate the motor and set stop 78 in various positions for precisely controlling the length of the strip material being cut.

In operation, strip material from supply 72 is conveyed along the serpentine path defined by feed means 74. The material then passes through the nip between feed drive wheels 84 and 86 and into the feed chute 88. From the feed chute, the strip material is fed into the strip holder 90 until the free end engages stop 78. Upon engagement of the stop 78, the timing of the apparatus is set such that knife cam 94 actuates cutter 76 to sever the measured length of strip material from the remainder of the strip material. After severing of the strip material, ejector cam 96 actuates ejector pins 92 to force the cut strip material from strip holder 90 downwardly into a housing receptacle 28 for downstream processing.

Each of the six cutting apparatus 70 is arranged in a staggered manner across the width of the housing stock material. In this manner, each cutting apparatus is aligned with a single row of the cavities being formed in the housing stock material. After initial start-up and setting of the production line, all of the cavities will be filled.

In the lid stock supply station 18, a 24 inch diameter roll 106 of 12 inch wide lid stock material 108 is conveyed into the production line to a position aligned with the longitudinal axis of the production line and housing stock material, downstream of resonator feed station 16. From a position above the open ends of the housing cavities, lid stock material 108 passes around a roller 110 to place the lid stock material over the open ends of the housing cavities to close the housing cavities. The composite of the housing stock material, resonator strips and lid stock material passes between the nip of the opposed cylinders of a knurled hot melt sealer 112 to heat and seal the lid stock material to the portions of the housing stock material forming housing bases 36. The heat seal bond between the housing stock material and the lid stock material can be replaced with an adhesive bond. In this manner, the resonator is encapsulated within the formed housing stock material and the lid stock material, but is free to move or vibrate about within the housing cavity.

Cover stock supply station 22 comprises a roll 114 of 12 inch wide cover stock material 116. The cover stock material can take various forms, depending upon the final product desired. If the final product is to terminate with cover 42, the cover stock material will merely be a single roll of plastic sheet (e.g., 0.0005 inch polyester) for forming cover 42. However, if the final product is to include paper liner 52 with release coating 54, the cover stock material will comprise a laminate of the paper liner with its release coding, and of the stock material for cover 42 with adhesive layer 50.

Cover stock material 116 is conveyed to a point along the production line longitudinal axis downstream of bias feed station 20, and then in an upstream direction, i.e., in a direction toward housing supply station 12, plastic forming station 14 and resonator feed station 16, to pass under bias feed station 20 to a point just upstream of bias feed station 20. A hot melt adhesive applicator 118 applies adhesive layer 44 to the inner surface of cover stock material 116 before the cover stock material passes under bias feed station 20. In bias feed station 20, bias strips 40 are cut from rolls 120 of the appropriate strip material by six side-by-side bias strip cutting apparatus 122. Each bias strip cutting apparatus is of the same design as provided for each resonator strip cutting apparatus 70, and thus, is not described in detail.

The resonator strips are deposited upon adhesive layer 44 on the cover stock material in the same staggered manner as provided for the resonator strips. After initial start-up, six complete rolls of bias strips will be provided on the inner surface of the cover stock material.

The cover stock material with the bias strips adhered thereon pass through another adhesive applicator 124 and then through a laminator 126. Laminator 126 comprises an upper roller 128 and a lower roller 130. The cover stock material-bias strip laminate passes around lower roller 130 and into the nip between rollers 128 and 130 along with the laminate of the housing stock material 24, resonator strips 30 and lid stock material 108. Suitable mechanical timing is provided for placing the biasing strips in a manner which will locate each bias strip directly above a housing cavity when the two sub-assembly laminates merge at laminator 126.

In this manner, the cover stock material is placed over the outer surface of the lid stock material and is adhered thereto, while simultaneously positioning and attaching the bias strips on the outer surface of the lid stock material remote from the housing cavities.

The composite of the housing stock material, the lid stock material and the cover stock material, along with the resonator strips and the bias strips then pass to a die cut station 134. Die cut station 134 comprises die cut rollers 136 and 138 through which this laminate passes. Waste material separated by the die cut rollers can be wound in a waste rewind roll 138.

For example, for forming security tags 124, on release sheet 52, as illustrated in FIG. 5, roller 138 can be a backing roller with the cutting performed by roller 138, which removes portions of the housing stock material, lid stock material and the cover stock material (except for the paper liner and release coating) from the composite exiting laminator 126. This final product can be then wound in a final product roll 140 at the downstream end of the production line. Prior to being wound, the devices can pass through an activation field 142 to activate magnetizable bias strips 40.

The removal of the waste material provides appropriate tag spacing to facilitate individual removal of each security tag from the release sheet. As an alternative to winding the final product in rolls, the final product can be made into fan-folded sheets or the sheets can be cut into a plurality of separate sheets bearing a plurality of security tags or cut into separate pieces for the individual tags.

Various testing procedures can be performed at the activation field stage. Suitable controls can be included for feed-back adjustments for maintaining manufacturing quality control.

While particular embodiments have been chosen to illustrate the invention, it will be understood by those skilled in the art that various changes and modifications can be made therein without departing from the scope of the invention as defined in the appended claims.

What is claimed is:

1. An apparatus for continuously manufacturing security tags, comprising:

a first supply for plastic housing material in a continuous web;

a plastic former, downstream of said first supply, for forming housing cavities in the plastic housing material without separating the continuous web;

a resonator feeder, downstream of said plastic former, for placing resonator strips in the housing cavities;

a second supply, downstream of said resonator feeder, for placing lid stock material over open ends of the housing cavities to seal the housing cavities closed with the resonator strips therein; and a bias feeder and a third supply, adjacent to one another downstream of said resonator feeder, for attaching bias strips and cover stock material to an outer surface of the lid stock material remote form the housing cavities with the cover stock material over the bias strips.

2. An apparatus according to claim 1 wherein said plastic former comprises a pair of cylinders defining a nip therebetween receiving the plastic housing material therebetween.

3. An apparatus according to claim 2 wherein one of said cylinders has positive images of the housing cavities; and the other of said cylinders has negative images of the housing cavities.

4. An apparatus according to claim 3 wherein at least one of said cylinders is coupled to a vacuum pressure source.

5. An apparatus according to claim 1 wherein a heater is positioned between said first supply and said plastic former for heating the plastic housing material.

6. An apparatus according to claim 1 wherein said plastic former forms the housing cavities in the continuous web of the plastic housing material in a plurality of parallel rows.

7. An apparatus according to claim 1 wherein said resonator feeder includes a plurality of side-by-side resonator cutters with each of said resonator cutters comprising:

a supply of strip material;

feed means for conveying said strip material from said supply;

a vertically reciprocating cutter mounted downstream of said feed means;

a cutter actuator coupled to said cutter to move and push said cutter against and through said strip material, said cutter actuator including a rotating cam that engages an end of said cutter remote from said strip material;

an adjustable stop, movably mounted adjacent said cutter, for engaging an end of said strip material and setting a precise length of said strip material being cut;

adjustment means, coupled to said stop, for moving said stop relative to said cutter along a longitudinal axis of the length of said strip material being cut, said adjustment means including a rotatably mounted rod with a fine pitch screw thread, said stop threadedly engaging said rod, said rod being connected to an electric stepper motor which controls rotations of said rod;

a strip holder positioned adjacent said cutter and extending between said feed means and said stop;

at least one vertically reciprocating ejector pin positioned adjacent said strip holder; and an ejector pin actuator coupled to said ejector pin and actuating said pin to move and push said strip material from said strip holder after cutting, said pin actuator including a rotating cam that engages and pushes said ejector pin against said strip material.

8. An apparatus according to claim 7 wherein said strip holder is magnetized.

9. An apparatus according to claim 1 wherein a hot melt sealer is between said second supply and said bias feeder for sealing the lid stock material to the plastic housing material.

10. An apparatus according to claim 1 wherein said second supply comprises a roll of the lid stock material in a continuous web having a width substantially equal to a width of the plastic housing material.

11. An apparatus according to claim 1 wherein said bias feeder comprises a plurality of strip, cutters and rolls of bias strip material arranged side-by-side.

12. An apparatus according to claim 1 wherein said third supply comprises an adhesive applicator for applying adhesive to an inner surface of the cover stock material; and said bias feeder is adjacent the inner surface of the cover stock for placing the bias strips on the adhesive.

13. An apparatus according to claim 12 wherein laminator rollers are located between said second supply and said bias feeder and form a nip therebetween to receive and seal continuous webs of the cover stock material and the lid stock material.

14. An apparatus according to claim 1 wherein a die cutter is located downstream of said bias feeder and said third supply.

15. An apparatus according to claim 1 wherein an activation feeder is located downstream of said bias feeder and said third supply.

16. An apparatus according to claim 1 wherein a laminator is located downstream of said second supply for securing the cover stock material to the lid stock material; and said bias feeder is located between said third supply and said laminator to place the bias strips on the cover stock material before the cover stock material is attached to the lid stock material.

* * * * *